United States Patent [19]

Gavalas et al.

[11] Patent Number: 5,503,873
[45] Date of Patent: Apr. 2, 1996

[54] METHOD FOR FORMING IMPROVED $H_2$-PERMSELECTIVE OXIDE MEMBRANES USING TEMPORARY CARBON BARRIERS

[75] Inventors: George R. Gavalas, Altadena; Shaocong Jiang, Pasadena, both of Calif.

[73] Assignee: California Institute of Technology, Pasadena, Calif.

[21] Appl. No.: 269,413

[22] Filed: Jun. 30, 1994

[51] Int. Cl.⁶ .............................. B05D 3/02; B05D /5/00
[52] U.S. Cl. ..................... 427/228; 427/226; 427/244; 427/245; 427/419.2; 427/419.7
[58] Field of Search ...................... 427/245, 228, 427/226, 243, 255.3, 236, 230, 419.7, 419.2

[56] References Cited

U.S. PATENT DOCUMENTS

| | | | |
|---|---|---|---|
| 4,640,901 | 2/1987 | Lee et al. | 427/245 |
| 4,738,874 | 4/1988 | Berardo et al. | 427/244 |
| 4,902,307 | 2/1990 | Gavalas et al. | 55/16 |
| 5,130,166 | 7/1992 | Spencer | 427/244 |

*Primary Examiner*—Janyce Bell
*Attorney, Agent, or Firm*—F. Eugene Logan

[57] ABSTRACT

A method of forming inorganic membranes which are highly selective to permeation of hydrogen by temporarily forming a carbon barrier in the pores of a porous substrate, followed by chemical deposition of $SiO_2$, $B_2O_3$, $TiO_2$, $Al_2O_3$ and mixtures thereof in the pores, followed by removal of the carbon barrier. It has been demonstrated that the permeation selective layers thusly formed by this invention have a five fold increase in permeance over such layers made by a similar method but without forming a temporary carbon barrier in the pores of the porous substrate, and removal of the carbon-barrier after establishment of the oxide membrane. Some suitable porous substrate are Vycor™ glass or $Al_2O_3$.

30 Claims, 4 Drawing Sheets

A - Plain Vycor glass.

B - After carbonisation and treatment with 10% $H_2O/N_2$ at 600°C for two hrs.

C - After eight cycles of alternating CVD with 6% $SiCl_4$-$N_2$ and 10% $H_2O$-$N_2$ at 600°C followed by teatment with 10% $H_2O/N_2$ at 600°C for 27 hrs.

D - After treatment with $O_2$ for 18 hrs at 600°C.

METHOD FOR FORMING IMPROVED H$_2$-PERMSELECTIVE OXIDE MEMBRANES USING TEMPORARY CARBON BARRIERS

TECHNICAL FIELD

This invention relates to an improved method of fabrication of inorganic membranes for separation of gases at high temperatures; it is especially concerned with the chemical vapor deposition of layers of SiO$_2$, B$_2$O$_3$, TiO$_2$, Al$_2$O$_3$ and their mixtures within the pores of porous support tubes. The resulting membrane structures are highly selective to permeation of hydrogen and can be used for separation of hydrogen coupled with various hydrogen producing reactions such as the water-gas shift, hydrogen sulfide decomposition, and ethylbenzene dehydrogenation. The membranes can also be used for hydrogen separation at elevated temperatures in the absence of chemical reaction.

BACKGROUND OF THE INVENTION

The development of inorganic films or membranes which are selectively permeable to specific gases and are able to withstand the adverse environments encountered in most processes is becoming increasingly important. Such membranes must be stable at high temperatures and resistant to chemical attack to be suitable for use in a combined process involving a catalytic reaction and product separation. Through the use of such selective permeation membranes, the yield of catalytic processes which are currently restricted by thermodynamic equilibrium can be significantly improved.

Inorganic membranes typically cost ten to one hundred times more than the commonly used polymer membranes. Because of their high cost the commercialization of inorganic membranes depends critically on their permeance or productivity. For a given processing duty the membrane capital cost is approximately inversely proportional to the membrane permeance which, in turn, depends inversely on the effective thickness of the membrane.

In U.S. Pat. No. 4,902,307, now U.S. Pat. No. 5,453,298 issued Sep. 26, 1995 (hereinafter referred to as the "PATENT"), prior art concerning inorganic membranes is reviewed. In the PATENT a technique, called the "opposing reactants deposition technique" for depositing internal SiO$_2$ layers within porous Vycor tubes ("sandwich configuration") is described. The deposition reaction set forth in the PATENT was the oxidation of silane (SiH$_4$). Briefly, that technique required the flow of one reactants, silane, inside the support tube, and the other reactant, oxygen, outside the support tube. The reactants diffuse in opposite directions and meet at some intermediate region within the tube wall where the film deposition reaction takes place. Once all the open pore paths are blocked by the deposited SiO$_2$, a barrier is formed which is highly selective to hydrogen permeation.

The PATENT disclosed that the thickness of the deposited film varied inversely with the reaction rate. Thus, increasing the temperature and the concentration of the reactants increased the reaction rate and resulted in thinner films. The practical temperature for SiO$_2$ deposition by oxidation of silane was found to be in the range of from 400° to 500° C. Below this range the reaction rate was reported as too slow, and the deposition film too thick; above this range silane would decompose thermally throughout the porous substrate forming a thick layer of silicon of extremely low permeability to all gases, including hydrogen.

In the PATENT, the SiO$_2$ films deposited at about 450° C. had hydrogen permeation rate coefficients of about 0.2 cm$^3$/cm$^2$-min-atm, and H$_2$:N$_2$ permeation rate ratios of about 3000, both measured at 450° C. immediately after deposition. Subsequent exposure to high temperatures, especially in the presence of water vapor, caused the permeability to hydrogen to decrease considerably. For example, it was reported that heating at 600° C. for one day in the presence of water vapor decreased the permeation rate by a factor of 3, and heating at 700° C. for an additional day led to a further 30% reduction. The decrease in permeability was attributed to densification of the SiO$_2$ film.

Ser. No. 221,873, filed Apr. 1, 1994, now U.S. Pat. No. 5,453,298 issued Sep. 26, 1995 the formation (hereinafter) referred to as the "APPLICATION") is concerned with of films of SiO$_2$, B$_2$O$_3$, TiO$_2$ , Al$_2$O$_3$ and mixtures thereof. These films were first formed as layers or films within the walls of a porous substrate tube by the hydrolysis of the respective halides (chlorides, bromides or iodides) by the "one-sided flow deposition method" or the "alternating deposition method" rather than by the opposing reactants deposition technique described in the PATENT. In the APPLICATION a SiO$_2$ layer is deposited by the reaction of silicon tetrachloride, SiCl$_4$, with water vapor, or by the reaction of the compound hexachlorodisiloxane or Cl$_3$SiOSiCl$_3$ with water vapor, or by the reaction of the compound octachlorotrisiloxane or Cl$_3$SiOSiCl$_2$OSiCl$_3$ with water vapor. The APPLICATION discloses that the latter two silicon compounds react faster with the Vycor™ glass substrate, and form thinner SiO$_2$ layers which have higher diffusivities than layers formed using silicon tetrachloride, SiCl$_4$.

The APPLICATION also disclosed that a SiO$_2$ layer can be deposited by the reaction of chlorosilanes, i.e. SiH$_x$Cl$_{4-x}$ (x=1, 2 or 3) with a mixture of water vapor and oxygen.

For brevity, the PATENT and the APPLICATION are hereinafter referred to collectively as the "REFERENCES". One of the inventors of the REFERENCES is also one of the inventors of this invention. The REFERENCES are hereby incorporated herein by reference.

The reaction between the halide reactants and the water vapor to form the oxide deposit can take place in the gas phase outside of the porous tube wall, and on the pore surface of the tube wall. Unfortunately, reactions in the gas phase produce particles which adhere to the tube wall. Such deposits form a relatively thick layer which decreases the membrane permeance and causes thermomechanical stresses that can result in cracks and membrane failure. This invention, and those of the REFERENCES, are not directed to deposition on the outside or inside surface of the porous tube but rather inside the porous tube wall, i.e. in a thin region somewhere between the outside surface and the inside surface of the porous tube, which is referred to herein as the "pore surface". Therefore, this invention and the APPLICATION seek to maximize oxide deposition on the pore surface and minimize oxide deposition on the external tube surface.

With the opposing reactants deposition technique of the PATENT it was possible to avoid or at least greatly decrease the generation of particles in the gas phase and the formation of an external deposit. However, the pore surface deposits, i.e. internal deposits between the external outside surface and external inside surface of the tube, formed by the opposing reactants deposition technique are relatively thick which is undesirable. The one-sided flow deposition method of the APPLICATION produced thinner and more permeable deposit layers and was a significant improvement over the opposing reactants deposition technique of the PATENT. However, in the one-sided flow deposition method, particle formation in the gas phase was not completely avoided but was greatly minimized by using low concentrations of reactants and carefully controlling the deposition time.

The APPLICATION further disclosed that the reactants concentrations decrease in the flow direction parallel to the axis of the porous tube, from entry point to exit point, due to the chemical reaction. As a result, the deposit layer at the upstream section of the porous tube, i.e. at the point where the reactants first contact the porous tube section, was thicker than at the downstream section, i.e. at the point where the reactants last contact the porous tube section. This caused the resulting membrane permeance to be lower than it would be for a layer of uniform thickness. Accordingly, the APPLICATION improved upon the one-sided deposition technique by the alternating flow deposition method. In the alternating flow deposition method the porous tube was first evacuated both on its inside and outside, the halide reactant was then introduced over the inside or outside surface of the porous tube, and time was allowed for the halide reactant to enter and become grafted on the pore surface.

In the APPLICATION, the porous tube was then purged with an inert carrier gas, e.g. $N_2$ to remove the halide reactant from the space inside or outside of the porous tube. After purging was completed, water vapor was allowed to flow over the same surface of the porous tube as the halide reactant previously flowed and hydrolysis of the halide on the pore surface occurred. After hydrolysis was completed, the porous tube was again purged with an inert carrier gas. These steps were repeated until the desired permeation selectivity of the deposit layer was achieved.

An important parameter in the alternating flow deposition method was the dosage of halide introduced into the evacuated porous tube per unit area of internal surface, i.e. the surface formed by the inside diameter of the tube. It was disclosed that the dosage should be sufficiently small to limit the depth of penetration in the pores of porous tube segment thereby limiting the thickness of the ultimately formed oxide layer. The smaller the halide dosage in a cycle, the thinner and the more permeable the oxide membrane formed in the cycle. Also, the smaller the halide dosage per cycle, the larger the number of cycles required to obtain the desired permeation selectivity. However, the improvement in the membrane permeation coefficient diminished and became insignificant when the dosage was decreased below a certain level. Control of the dosage was achieved by controlling the concentration of the halide flowed into the porous tube.

Non-limiting examples of preferred porous supports are substrates made of Vycor™ Brand Glass No. 7930 and $Al_2O_3$. The Vycor™ glass used in the REFERENCES and herein as the porous substrate is a porous borosilicate glass with over 96% $SiO_2$, 3% $B_2O_3$, and smaller amounts of $Al_2O_3$, and other oxides. The mean pore diameter is in the range of 25Å to 120Å depending on the manufacturing conditions Tubes made from Vycor™ Brand Glass No. 7930 used in most of the experiments in the REFERENCES and herein, had mean pore diameter 40Å, internal diameter (ID) 4.8–5 mm, and external diameter (OD) 6.8 to 7.2 mm.

SUMMARY OF THE INVENTION

Most inorganic membranes currently under development are of the so-called composite type comprising a thin layer providing the separation selectivity formed inside the pores, or on the surface, of a porous substrate usually in the form of a tube or plate. The thin selective layer is deposited on the porous substrate by liquid phase technique or by chemical vapor deposition (CVD). We have improved CVD techniques for forming thin layers of nonporous $SiO_2$ inside the pores of mesoporous supports (porous Vycor glass) using $SiCl_4$ (or other similar compounds) and $H_2O$ as reactants. The thickness of the deposited $SiO_2$ layer is controlled by the penetration of the reactants in the pores of the porous substrate. The penetration depth decreases as the rate coefficient of the deposition reaction increases and as the reactant diffusion coefficient decreases. The deposition rate coefficient can be increased by increasing the temperature, however, there is usually a maximum temperature beyond which the substrate's reactivity will decrease by loss of active sites (silanol groups), or the substrate's porosity will collapse. The diffusion coefficient, on the other hand is determined by the pore size distribution of the substrate. In this invention forming temporary carbon barrier layers as detailed below makes it possible to temporarily decrease the diffusion coefficient until CVD is completed. After deposition of the $SiO_2$ layer the carbon barrier is removed by oxidation leaving behind a $SiO_2$ layer with improved high hydrogen permeance and improved permselectivity.

Experimental Procedure

The carbon barrier can be formed by polymerization of a suitable monomer inside the pores of the porous substrate followed by carbonization of the resulting polymer. For this purpose it is preferable to use a polymer which upon heating produces adequate yield of carbon. Polyfurfuryl alcohol and phenol-formaldehyde polymers are known to have a relatively high carbon yield, i.e. about 60%, but other highly cross-linked polymers, especially those deriving from aromatic monomers, i.e. aromatic polyamides, or a romatic polyimides, are also be suitable for this purpose.

The monomer, or monomers, can be introduced into the porous substrate by simply dipping the porous substrate in the liquid monomer. If a polymerization catalyst is necessary, it can be dissolved in the monomer before introduction into the porous substrate, or alternatively it can be introduced into the porous substrate prior to the introduction of the monomer. After introduction of catalyst and monomer, the porous substrate is heated to the desired temperature to carry out the polymerization. Further time at the same or higher temperature is allowed for crosslinking to take place. After polymerization and crosslinking, the polymer/substrate is carbonized by slowly raising its temperature in an inert atmosphere to the temperature required for the subsequent CVD.

As an alternative to the sequential introduction of the monomer as a liquid and subsequent polymerization, monomer introduction and polymerization can be conducted simultaneously by vapor transfer polymerization (VTP). In this alternative procedure, after introduction of the catalyst, the porous substrate is heated to the polymerization temperature and exposed to vapors of the monomer. Adsorption and reaction of the monomer take place simultaneously on the pore surface until the pores become blocked. Because of the depletion of the monomer near the external surface, the penetration depth is limited, and by the time the pores become blocked, the polymer layer occupies only a small fraction of the thickness of the porous substrate. The final carbon layer is, accordingly, much thinner than the layer obtained using the liquid dip impregnation procedure described above. Although the thickness of the carbon layer does not directly influence the subsequent formation of the inorganic membrane, the thin layer obtained by VTP is helpful because it allows easier measurement Of the evolving permeance during CVD. When the carbon layer Occupies the whole width of the porous substrate the permeation rate is too low, making it difficult to monitor the membrane properties during CVD.

Following carbonization, CVD of the permselective oxide layer is carried out using a suitable technique such as the alternating flow deposition method or the one-sided flow deposition method described in the APPLICATION, or the opposing reactants deposition technique of the PATENT. After the CVD step, the carbon layer is removed by reaction with oxygen at a suitable high temperature.

DESCRIPTION OF THE PREFERRED EMBODIMENTS

Figure 1:
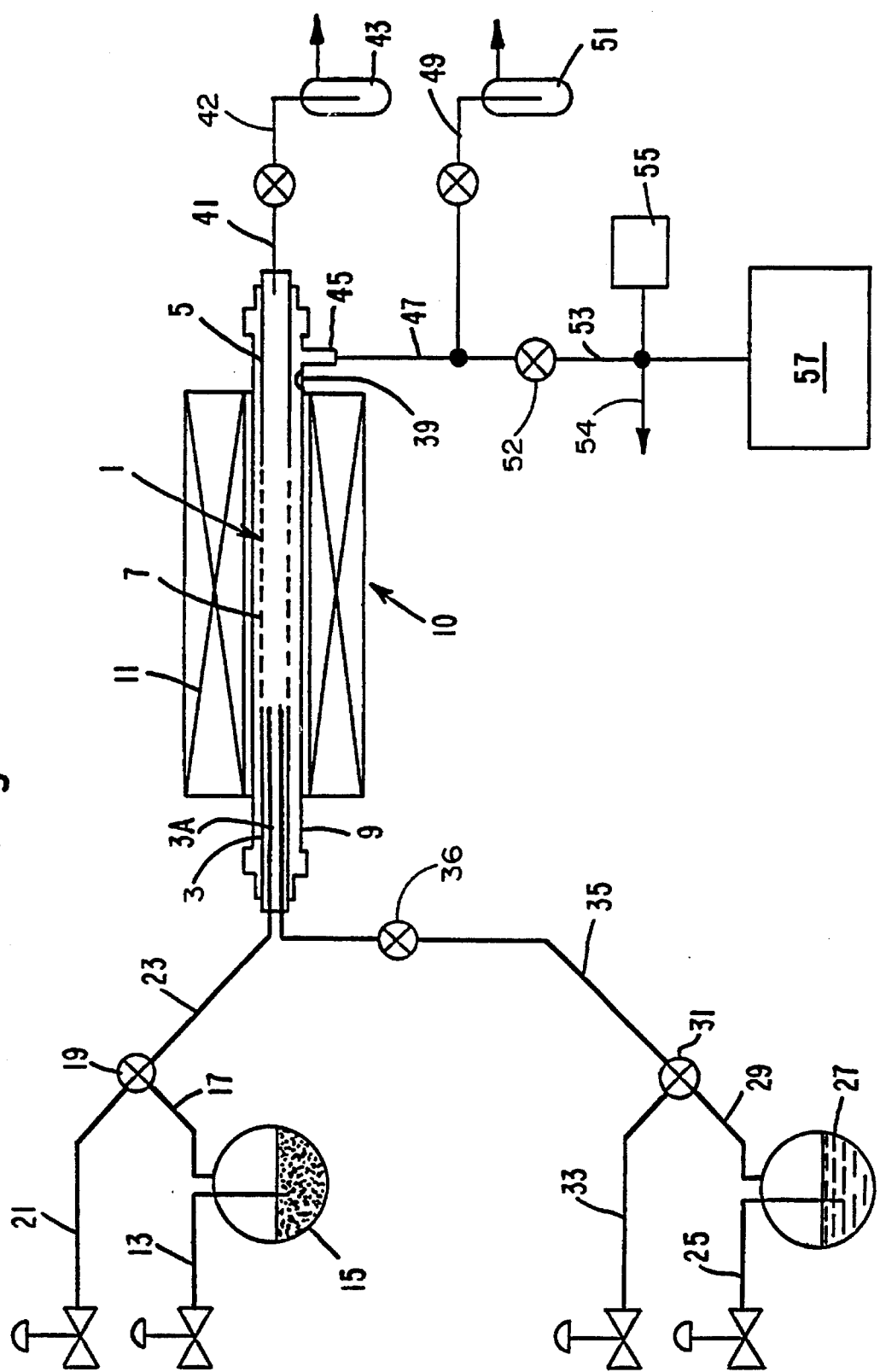
FIG. 1, identified as prior art, is a schematic side view, partially cut away, of an apparatus used to deposit the oxide layer by the one-sided flow deposition method of the APPLICATION with the reactants entering on the inside, i.e. along the ID, of the porous tube.
Figure 2:
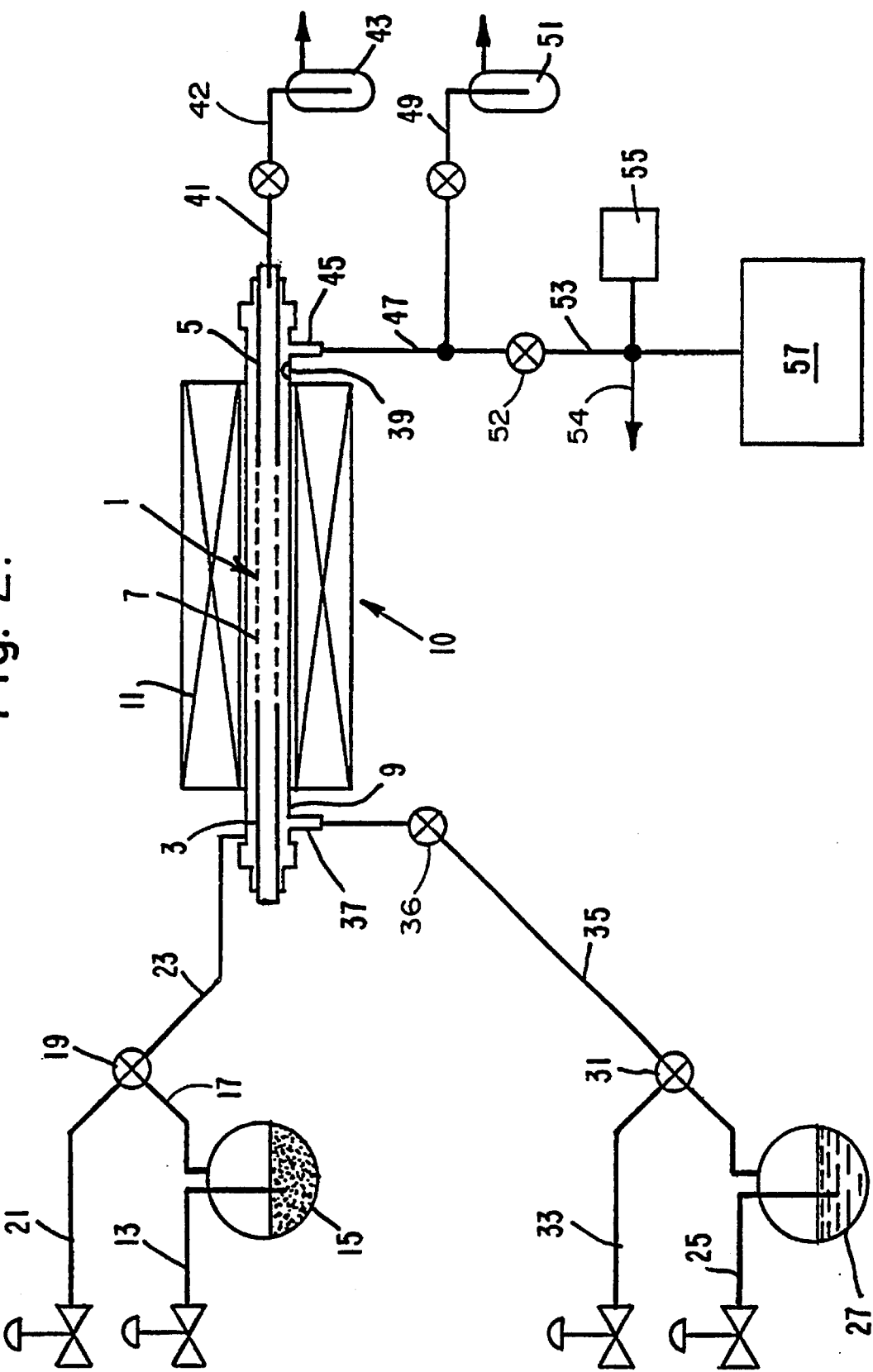
FIG. 2, also identified as prior art, is a schematic side view, partially cut away, of an apparatus used to deposit the oxide layer by the one sided flow deposition method with the reactants entering on the outside, i.e. over the OD, of the porous tube.
Figure 3:
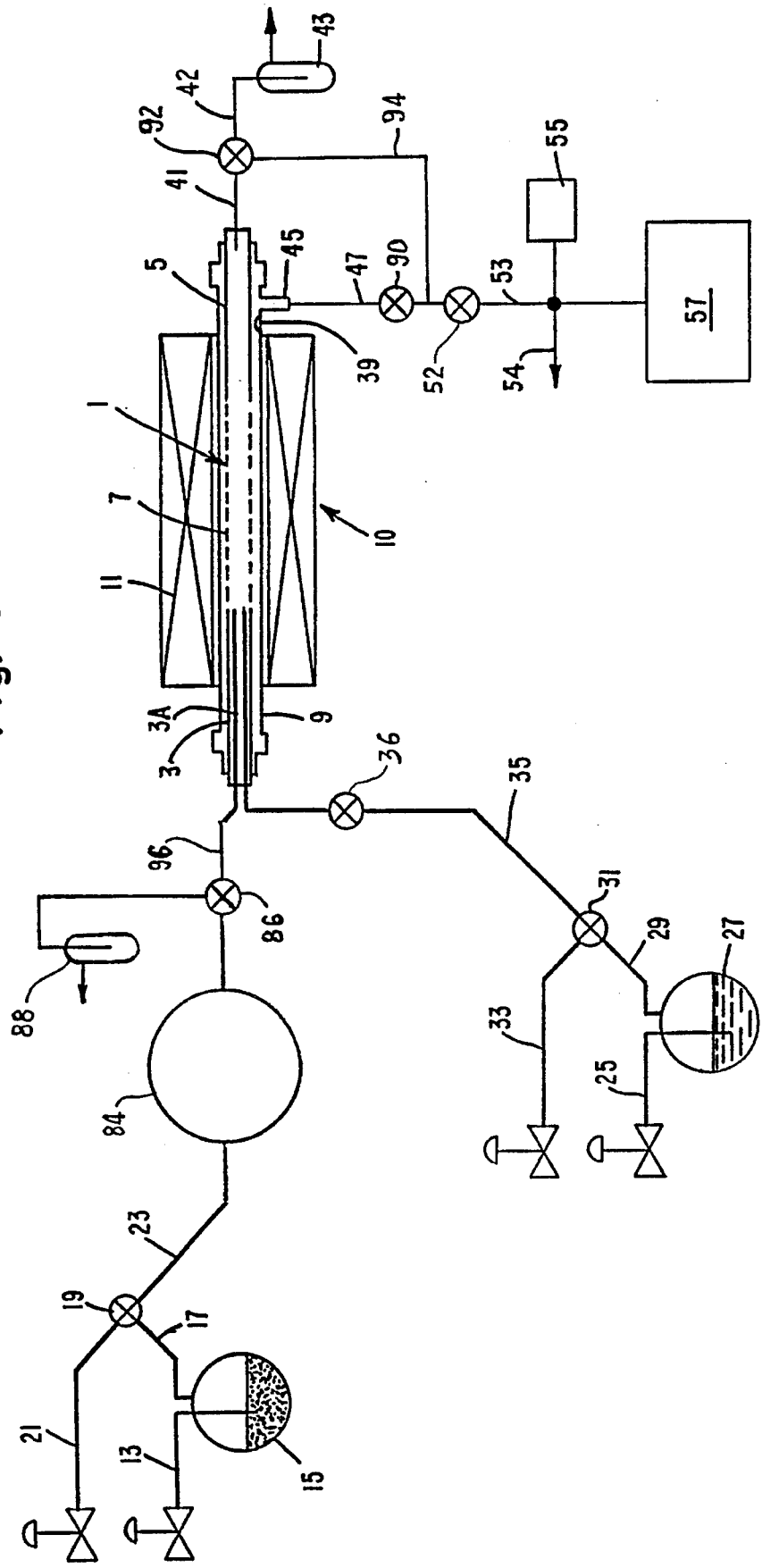
FIG. 3, identified too as prior art, is a schematic side view, partially cut away, of an apparatus used to deposit the oxide layer by the alternating flow deposition technique of the APPLICATION with the reactants entering alternately through the inside, i.e. over the ID, of the porous tube.

Referring to the drawings, like numerals of reference designate like elements throughout. FIG. 1 illustrates an apparatus for the one-sided flow deposition method with reactants entering the pores of the porous substrate from the ID. FIG. 2 illustrates an apparatus for the one-sided flow deposition method with reactants entering the pores of the porous substrate from the OD. FIG. 3 illustrates an apparatus for the alternating flow deposition method with reactants entering the pores of the porous substrate from the ID.

With reference to FIG. 3, the steps for forming the temporary carbon barrier of this invention will be described first.

The temporary carbon barrier layers were prepared by polymerization of furfuryl alcohol (FA) inside the pores of porous substrate Vycor tubes (e.g. FIG. 3, tube 1) of 5 mm ID, 7 mm OD, and 40 Å mean pore diameter, followed by carbonization of the resulting polymer. The porous substrate tube, i.e. section 7, was welded on both ends to nonporous quartz segments 3 and 5 to permit connection with other parts of the flow reactor system.

The Vycor porous substrate tube was prepared for polymerization by impregnation with a 2N aqueous solution of p-toluene sulfonic acid which serves as a catalyst for the polymerization. After impregnation with the aqueous acid solution and drying in laboratory air, the tube was placed concentrically within a wider quartz tube 9, connected with lines for flow of various gases and placed in an electrical furnace. The tube was heated at 100° C. for 1 hour to remove the water held in the pores and then brought to the polymerization temperature of 95° C.

Polymerization was carried out by flowing through the inside of the Vycor tube a mixture of 10% furfuryl alcohol in nitrogen carrier. The FA-$N_2$ mixture was generated by flowing gaseous $N_2$ through a bubbler (similar to bubbler 15) containing the liquid FA The composition of the FA-$N_2$ mixture was controlled by the temperature of the bubbler. Polymerization was conducted for 15 minutes. After terminating the FA flow the tube was kept under $N_2$ flow at the same temperature for 24 hours to complete the polymerization. During this period the permeance of porous tube segment 7 to different gases was measured periodically.

Figure 4:
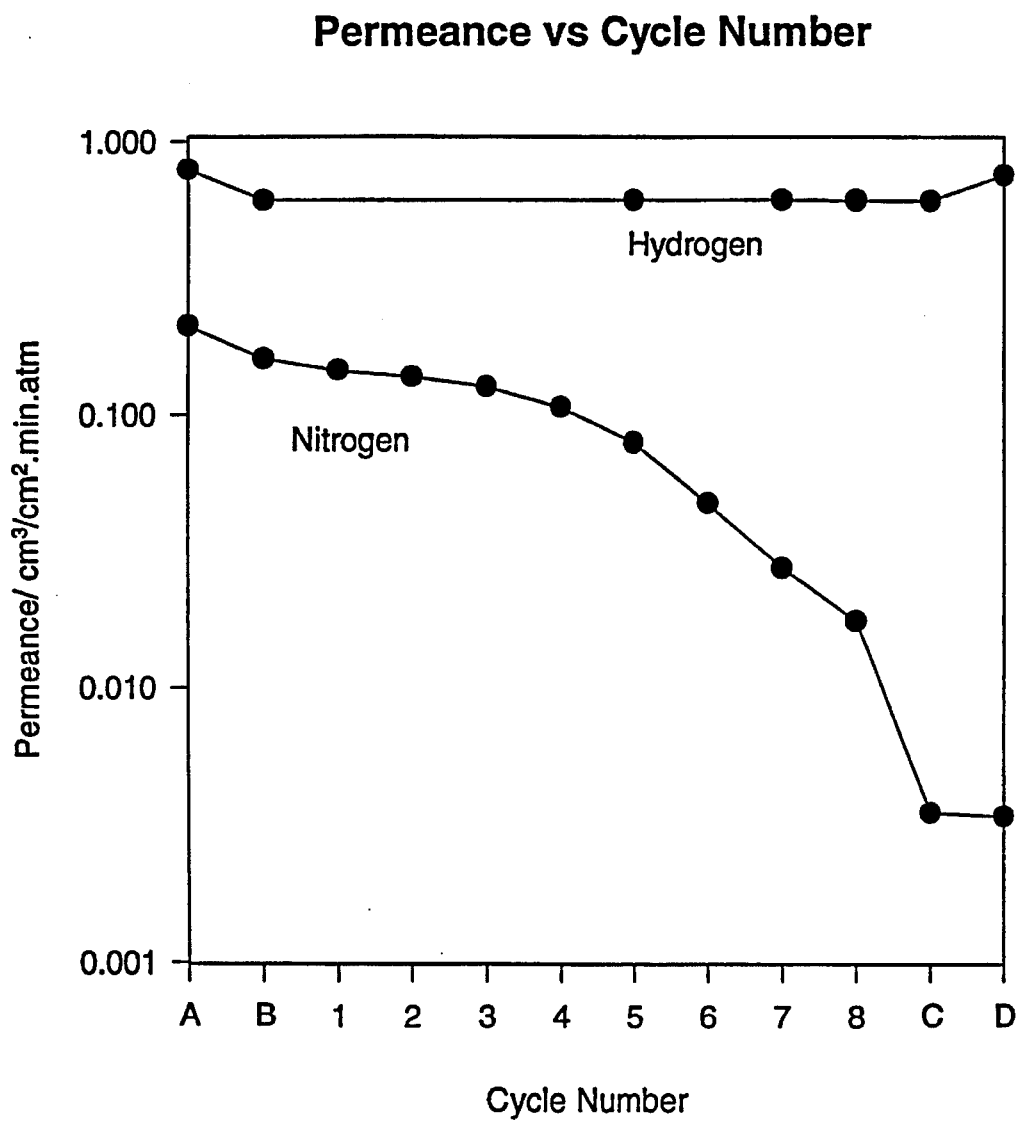
FIG. 4 illustrates the evolution of hydrogen and nitrogen permeation coefficients at 600° C. after each of the several membrane formation steps of this invention, namely an initial carbon-barrier-formation step, eight successive cycles of $SiO_2$ deposition at 800° C. by the alternating flow deposition method, and a final carbon barrier removal step.

After the 24 hours heating in $N_2$ flow, the tube was heated at 1° C./minute to 150° C. and kept at that temperature for two hours, then heated at 1° C./minute to 180° C. and kept at that temperature for two hours, and then heated at 1° C./minute to 600° C. After reaching 600° C. the tube was exposed to a stream of 10% $H_2O$—$N_2$ at 600° C. for 2 hours to activate the pore surface. The tube was then subjected to 8 cycles of alternating deposition using $SiCl_4$ and $H_2O$ reactants. After deposition the tube was heated in a stream of 10% $H_2O$—$N_2$ at 600° C. for 27 hours and then treated in pure gaseous $O_2$ at 600° C. for 18 hours to completely oxidize and remove the carbon from the membrane layer. The permeance of $H_2$ and $N_2$ after each of the above treatments is shown in FIG. 4 and Table 1. The hydrogen permeance of the final membrane was only 9% lower than that of the porous substrate, i.e. 91% of the resistance to permeation is due to the porous substrate. By using a porous substrate of higher permeance the overall membrane permeance can be accordingly increased.

Table 2 shows the permeance of the deposit layer obtained from the permeance of the tube after subtracting the resistance due to the porous substrate. The activation energy of the hydrogen permeance of the deposit layer corrected for the resistance of the porous substrate is 26 kJ/mol, a value close to those measured earlier in our laboratory for silica membranes subjected to prolonged hydrothermal annealing.

Table 3 compares the permeance of the deposit layer (after subtracting the resistance of the porous substrate from the overall permeance) of the membrane prepared using the carbon barrier with that of a membrane prepared earlier by the alternating CVD procedure but without using the carbon layer. It is seen that the use of the carbon barrier increased the silica layer permeance by approximately a factor of five at all temperatures.

The above procedure included a two-hour activation with steam at 600° C. conducted immediately before CVD. The purpose of this step was to remove from the pore surface any carbon overlay which may impede reaction with $SiCl_4$. We have verified by independent experiments that this step removes only a small fraction of the total carbon in the pores. In another experiment, after carbonization the tube carrying the carbon layer was cooled and left under laboratory air for three weeks, then heated again at 1° C./minute to 600° C. Chemical vapor deposition was then carried out immediately after reaching 600° C. without prior steam activation. The resulting membrane had properties very similar to those shown in Tables 1 and 2. This demonstrated that the steam activation step is not always necessary.

A more detailed description of the one-sided flow deposition method and the alternating flow deposition method, similar to that in the APPLICATION, follows since such methods are useful in the preferred embodiments of this invention.

FIG. 1 shows schematically an apparatus 10 for depositing oxide layers within the walls of porous tube 1 using the one-sided flow deposition method. Tube 1 has nonporous segments 3 and 5 at opposite ends and porous section 7 between segments 3 and 5. Tube 1 is surrounded by outer concentric, nonporous tube 9 of larger diameter, thus forming annulus 39. The concentric tubes 1 and 9 are placed in electrical furnace 11.

A halide reactant stream is generated by flowing an inert carrier gas like nitrogen through line 13 into bath 15 of controlled temperature containing liquid or solid halide. In the case of gaseous halides (e.g. $BCl_3$), bath 15 is replaced by a cylinder (not shown) containing compressed halide gas. The mol fraction of the halide in this stream is controlled by the temperature of bath 15 and the flow rate of nitrogen into bath 15 through line 13. The halide and nitrogen mixture flows through line 17 to valve 19 where it can be diluted with more inert gas from line 21. The mixture from valve 19 then passes through line 23 into the inside part, i.e. along the ID, of nonporous segment 3 of porous substrate tube 1.

A stream of water vapor having the desired mol fraction of water is generated by passing an inert carrier gas like nitrogen at a controlled flow rate through line 25 into water bath 27; bath 27 is maintained at a controlled temperature. This stream is introduced through line 29 into valve 31 where it can be diluted with more gas from line 33. The water vapor-inert gas mixture from valve 31 flows through line 35 into the inside part 3A, i.e. along the ID, of nonporous segment 3.

The mol fractions of halide in the halide stream and of water in the water stream can be varied considerably. Useful ranges of these mol fractions are 0.01–0.2 for the halide and 0.05–0.5 for the water streams.

The gases from inside tube 1 are conducted through line 41 to bath 43. The gases in annulus 39 leave through tube projection 45 and then through lines 47 and 49 to bath 51. Both baths 43 and 51 contain solutions of sodium hydroxide; unreacted halide is decomposed in the hydroxide, and hydrochloric, hydrobromic or hydroiodic acid, generated by hydrolysis of the halide, is neutralized. The outlet of annulus 39 can be alternatively connected through projection 45 and line 47 to vacuum line 53 and then to: pressure gauge 55 or mass spectrometer 57.

In another one-sided: flow deposition method, schematically illustrated in FIG. 2, the introduction of halide through line 23, and water vapor through line 35 and inlet 37, is into annulus 39 or over the OD of the porous segment 7 of porous tube 1. The various streams can be mixed, diverted, or cut off, as desired by various valves indicated in FIGS. 1 and 2 by the conventional valve symbol the encircled "X".

FIGS. 1 and 2 are schematic diagrams of apparatuses used for oxide deposition in the One-sided flow deposition method. The apparatus of FIG. 2 is identical to that of FIG. 1 except that the two reactant lines 23 and 35 are introduced outside nonporous segment 3 of porous substrate tube 1 rather than inside as in FIG. 1. In either arrangement, the point of introduction should allow complete mixing before the reactants reach the beginning of porous section 7 of tube 1.

The composition and flow rate of the combined reactant stream must be chosen so that gas phase formation of oxide particles is prevented or minimized to a non-detrimental amount. This generally requires low partial pressures of chloride or high flow rates. The precise range of useful composition and residence times are interdependent and, in addition, depend on the temperature and the particular reaction employed.

Porous substrate section 7 is preferably made of Vycor™ glass having an internal diameter of about 100 μm to about 5 mm, a wall thickness from about 20 μm to about 1 mm, and a mean pore diameter from about 10 Å to about 220 Å; or of $Al_2O_3$ with an internal diameter of about 0.5 mm to about 1 cm, a wall thickness from about 0.1 mm to about,: 2 mm, and a mean pore diameter from about 20 Å to about 1000 Å.

FIG. 3 is a schematic diagram of an apparatus and method for oxide deposition by the alternating flow deposition method. The apparatus of FIG. 3 is similar to that of FIG. 1 except that line 23 contains storage vessel 84, three-way valve 86, and bath 88 which are connected to reactor tube segment 3, outlet line 47 contains valve 90, line 41 contains three-way valve 92, and by-pass line 94 has been added. Bath 88 is similar in design and operation to baths 43 and 51.

Deposition of oxide layers by the alternating flow deposition method requires a number of successive cycles during which the oxide is formed in discrete layers over spaced apart periods of times. Each cycle involves the following procedure. Unless stated otherwise, valves 36 and 52 are always open.

With valve 19 opened to flow from halide bath 15 to line 23, and with valve 86 opened to flow from storage vessel 84 to bath 88, storage vessel 84 is charged with a predetermined amount of the halide from bath 15. Valves 19 and 86 are then closed to all flow. With tube segment 7 evacuated, valve 86 is opened to flow from storage vessel 84 to line 96 for one or two seconds to fill the inside of tube segment 7 with halide-$N_2$ gas from storage vessel 84, and thereafter valve 86 is closed again to all flow. A few minutes is then allowed for the halide gas to enter and react on the pore surface of tube segment 7. With valves 31 and 86 closed to all flow therethrough, with valves 92 open between lines 41 and 94, and with valve 90 open, the inside and outside of porous tube segment 7 is evacuated through line 54 which is connected to a vacuum pump (not shown in the drawing).

Subsequently, tube segment 7 is purged with $N_2$ by opening valve 31 between lines 33 and 35, and by opening valve 92 between lines 41 and 42. After the $N_2$ purge is completed, valve 90 is closed to all flow, valve 92 is opened to flow between lines 41 and 42 and valve 31 is opened to flow between lines 29 and 35, thereby allowing a steady stream of water vapor from water bath 27 to flow into tube segment 7. During this period of time all halide on the pore surface of tube segment 7 is hydrolyzed and the resulting halide acid gas is neutralized in trap 43. Thereafter, in the final part of the cycle, tube segment 7 is again purged with pure $N_2$ carrier gas to remove all traces of water vapor. Tube segment 7 is now ready for the next cycle and the steps of (a) evacuation, (b) entry and grafting of halide on the pore surface, (c) evacuation, (d) $N_2$ purge, (e) hydrolysis of the halide on the pore surface, and (f) $N_2$ purge, are repeated a predetermined number of times until the desired hydrogen selectivity is obtained.

An important parameter in the alternating flow deposition method is the dosage of halide introduced into evacuated tube segment 7 per unit area of internal surface, i.e. inside diameter surface, of the tube. This dosage should be sufficiently small to limit the depth of penetration in the pores of tube segment 7 thereby limiting the thickness of the ultimately formed oxide layer. The smaller the halide dosage in a cycle, the thinner and the more permeable the oxide membrane formed in the cycle. Also, the smaller the halide dosage per cycle, the larger the number of cycles required to produce a membrane of a certain thickness. The improvement in the permeation coefficient of the deposit layer diminishes and becomes insignificant when the dosage is decreased below a certain level. Control of the dosage is achieved by controlling the concentration of the halide in storage vessel 84. After a predetermined number of cycles, the halide in vessel 84 is replenished by flow from bubbler 15.

While the preferred embodiments of the present invention have been described, it should be understood that various changes, adaptations and modifications may be made thereto without departing from the spirit of the invention and the scope of the appended claims. It should be understood, therefore, that the invention is not to be limited to minor details of the illustrated invention shown in preferred embodiment and the figures, and that variations in such minor details will be apparent to one skilled in the art.

Therefore it is to be understood that the present disclosure and embodiments of this invention described herein are for purposes of illustration and example and that modifications and improvements may be made thereto without departing from the spirit of the invention or from the scope of the claims. The claims, therefore, are to be accorded a range of equivalents commensurate in scope with the advances made over the art.

INDUSTRIAL APPLICABILITY

Porous tubes which contain layers of $SiO_2$, $B_2O_3$, $TiO_2$, $Al_2O_3$ and mixtures thereof are suitable for separation of $H_2$ from gas mixtures at temperatures from 300° to 800° C. They are particularly suited for separation of $H_2$ simultaneously with an equilibrium-limited catalytic reaction such as the water-gas shift reaction, the dissociation of hydrogen sulfide, and the dehydrogenation of ethylbenzene. The membranes containing $B_2O_3$ and $B_2O_3$—$SiO_2$ are suitable for separation of $H_2$, with or without simultaneous chemical reaction, at temperatures from 100° to 400° C.

TABLE 1

Permeation properties of the silica membrane of the example at various stages during preparation

| Treatment | Pearmeance at 600° C. cm³(STP) cm²-min-atm $H_2$ | $N_2$ | Selectivity $H_2:N_2$ |
| --- | --- | --- | --- |
| None (bare support tube) | 0.787 | 0.210 | 3.75 |
| Vapor transfer polymerization, carbonization at 600° C., and reaction with 10% $H_2O$—$N_2$ for 2 hours at 600° C. | 0.608 | 0.160 | 3.80 |
| 8 cycles of alternating CVD at 600° C. | 0.603 | 0.018 | 33.5 |
| Heating in 10% $H_2O$—$N_2$ for 27 hours at 600° C. | 0.601 | $3.4 \times 10^{-3}$ | 175 |
| Heating in pure $O_2$ for 18 hours at 600° C. | 0.749 | $3.3 \times 10^{-3}$ | 224 |
| Heating in 10% $H_2O$—$N_2$ for 18 hours at 600° C. | 0.692 | $7.1 \times 10^{-4}$ | 975 |

TABLE 2

Hydrogen permeance of a silica membrane with and without the resistance of the support tube

| Temperature, °C. | $H_2$ Permeance, cm³(STP)/cm²-min-atm | | |
| --- | --- | --- | --- |
| | support tube plus deposit layer | support tube | deposit layer |
| 450 | 0.667 | 0.867 | 2.90 |
| 523 | 0.679 | 0.824 | 3.85 |
| 600 | 0.692 | 0.787 | 5.75 |
| 700 | 0.687 | 0.747 | 8.56 |

TABLE 3

Comparison of deposit layer permeances of membranes prepared by alternating CVD with and without the use of carbon barrier

| | $H_2$ Permeance, cm³(STP)/cm²-min-atm | |
| --- | --- | --- |
| Measurement T (°C.) | Membrane prepared without carbon barrier | Membrane prepared with carbon barrier |
| 450 | 0.62 | 2.90 |
| 600 | 1.13 | 5.75 |
| 700 | 1.57 | 8.56 |

What is claimed is:

1. A method for forming a permselective oxide membrane having hydrogen permselectivity comprising:

(a) providing an inorganic porous substrate having a first surface and a second surface and a thickness therebetween which define a substrate wall with pores extending through the substrate wall between the first and second surfaces;

(b) introducing a carbonizable carbon-containing material into the pores of the porous substrate;

(c) heating the carbon-containing material in the pores of porous substrate at an elevated temperature operable for carbonizing the carbon-containing material thereby forming a carbon barrier within the pores;

(d) forming an oxide membrane selected from the group consisting of $SiO_2$, $B_2O_3$, $TiO_2$, $Al_2O_3$ and their mixtures within the pores containing the carbon barrier; and (e) after forming the oxide membrane, oxidizing the carbon barrier to increase the permeance of the oxide membrane.

2. The method of claim 1, further comprising repeating at least one additional time the steps of placing the carbon-containing material within the pores and carbonizing it before forming the oxide membrane.

3. The method of claim 1, further comprising repeating at least two additional times the steps of placing the carbon-containing material within the pores and carbonizing it before forming the oxide membrane.

4. The method of claim 1, wherein the carbon-containing material is selected from the group consisting of poly(furfuryl alcohol), phenol formaldehyde resins, aromatic polyamides, and aromatic polyimides.

5. The method of claim 1, wherein the carbon-containing material is an organic polymer.

6. The method of claim 5, further comprising treating the porous substrate with a polymerization catalyst before placing the within the pores.

7. The method of claim 1, wherein the carbon-containing material is a monomer of an organic polymer, and further comprising treating the porous substrate with a polymerization catalyst before placing the monomer within the pores.

8. The method of claim 7, wherein the polymerization catalyst is selected from the group consisting of p-toluene sulfonic acid, benzene sulfonic acid, and mixtures thereof.

9. The method of claim 7, wherein the monomer is furfuryl alcohol.

10. The method of claim 1, further comprising forming the oxide membrane by chemical vapor deposition.

11. The method of claim 1, further comprising forming the oxide membrane by a liquid phase technique.

12. The method of claim 1, further comprising forming the oxide membrane by depositing an oxide precursor within the pores, and reacting the oxide precursor with a reagent operable for transforming the oxide precursor into the oxide membrane, wherein the reagent is selected from the group consisting of water vapor, and water vapor and oxygen.

13. The method of claim 12, further comprising repeating at least one additional time the steps of placing the carbon-containing material within the pores and carbonizing it before forming the oxide membrane.

14. The method of claim 12, wherein before oxidizing the carbon barrier, repeating a number of times the steps of depositing the oxide precursor within the pores, and reacting the oxide precursor with the reagent operable for transforming the oxide precursor into the oxide membrane.

15. The method of claim 14, wherein the number of times is from about 2 to about 50.

16. The method of claim 14, wherein the number of times is from about 5 to about 15.

17. The method of claim 12, wherein the oxide precursor has the formula $RX_n$ wherein R is silicon, titanium, boron or aluminum, X is chlorine, bromine or iodine, and n is a number which is equal to the valence of R, and the reagent is water vapor.

18. The method of claim 12, wherein the oxide precursor has the formula $SiH_nCl_{4-n}$ wherein n is a number which is 1, 2 or 3, and the reagent is water vapor: and oxygen.

19. The method of claim 12, wherein the oxide precursor is selected from the i group consisting of $Cl_3SiOSiCl_3$, $Cl_3SiOSiCl_2OSiCl_3$, and mixtures thereof, and the reagent is water vapor.

20. The method of claim 12, further comprising forming the oxide membrane by the alternating flow deposition method.

21. The method of claim 12, further comprising forming the oxide membrane by the one-sided flow deposition method.

22. The method of claim 12, further comprising forming the oxide membrane by the opposing reactant flow deposition method.

23. The method of claim 1, wherein the porous substrate is a tube.

24. The method of claim 1, wherein the porous substrate is selected from the group consisting of substrates having hydroxyl groups within the pores, and being capable of withstanding about a 600° C. environment for a period of time without detrimental degradation of its porous structure; and further comprising conducting the oxidation of the carbon barrier at a temperature no greater than about 600° C. for no longer than the predetermined period of time.

25. The method of claim 1, wherein the porous substrate is selected from the group consisting of substrates having hydroxyl groups within the pores, and being capable of withstanding about a 700° C. environment for a period of time without detrimental degradation of its porous structure; and further comprising conducting the oxidation of the carbon barrier at a temperature no greater than about 700° C. for no longer than the period of time.

26. The method of claim 1, wherein the porous substrate is selected from the group consisting of glass and $Al_2O_3$.

27. A method for forming a permselective oxide membrane having hydrogen permselectivity comprising:

(a) providing an inorganic porous substrate having a first surface and a second surface and a thickness therebetween which define a substrate wall with pores extending through the substrate wall between the first and second surfaces;

(b) introducing a carbonizable carbon-containing material into the pores of the porous substrate;

(c) heating the carbon-containing material in the pores of porous substrate at an elevated temperature operable for carbonizing the carbon-containing material thereby forming a carbon barrier within the pores;

(d) forming an oxide membrane selected from the group consisting of $SiO_2$, $B_2O_3$, $TiO_2$, $Al_2O_3$ and their mixtures within the pores containing the carbon barrier; and (e) repeating a number of times the step of forming the oxide membrane within the pores containing the carbon barrier; and thereafter (f) oxidizing the carbon barrier to increase the permeance of the oxide membrane, thereby forming a permselective oxide membrane having hydrogen permselectivity.

28. The method of claim 27, wherein the porous substrate is selected from the group consisting of glass and $Al_2O_3$.

29. A method for forming a permselective oxide membrane having hydrogen permselectivity comprising:

(a) providing an inorganic porous substrate having a first surface and a second surface and a thickness therebetween which define a substrate wall with pores extending through the substrate wall between the first and second surfaces;

(b) introducing a carbonizable carbon-containing material into the pores of the porous substrate;

(c) heating the carbon-containing material in the pores of porous substrate at an elevated temperature operable for carbonizing the carbon-containing material thereby forming a carbon barrier within the pores;

(d) repeating a number of times the steps of introducing the carbon-containing material within the pores and carbonizing it; thereafter (e) depositing an oxide precursor which is transformable into an oxide membrane selected from the group consisting of $SiO_2$, $B_2O_3$, $TiO_2$, $Al_2O_3$ and their mixtures within the pores;

(f) reacting the oxide precursor with a reagent operable for transforming the oxide precursor into said oxide membrane, wherein the reagent is selected from the group consisting of water vapor, and water vapor and oxygen;

(g) repeating a number of times the steps of depositing the oxide precursor within the pores, and reacting it with the reagent; and thereafter (h) oxidizing the carbon barrier to increase the permeance of the oxide membrane, thereby forming a permselective oxide membrane having hydrogen permselectivity.

30. The method of claim 29, wherein the porous substrate is selected from the group consisting of glass and $Al_2O_3$.

* * * * *